United States Patent
Kim

(10) Patent No.: US 9,731,554 B2
(45) Date of Patent: Aug. 15, 2017

(54) ENCLOSURE EXPANSION TYPE VIRTUAL ENGINE SOUND SYSTEM AND VEHICLE USING THE SAME

(71) Applicant: Hyundai Motor Company, Seoul (KR)

(72) Inventor: Young Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/227,225

(22) Filed: Aug. 3, 2016

(65) Prior Publication Data

US 2017/0106787 A1    Apr. 20, 2017

(30) Foreign Application Priority Data

Oct. 19, 2015  (KR) .......................... 10-2015-0145324

(51) Int. Cl.
*B60C 5/00* (2006.01)
*H04R 1/28* (2006.01)
*H04R 1/02* (2006.01)

(52) U.S. Cl.
CPC ............ *B60C 5/008* (2013.01); *H04R 1/026* (2013.01); *H04R 1/2819* (2013.01); *H04R 2499/13* (2013.01)

(58) Field of Classification Search
CPC .......... B60Q 5/008; B60Q 11/00; B60Q 9/00; H04R 1/026; H04R 1/2819; H04R 2499/13; H04R 29/001; B60R 19/48; B60H 1/00564; B62D 35/005; B62D 35/007
See application file for complete search history.

(56) References Cited

U.S. PATENT DOCUMENTS

| 2005/0135642 | A1 | 6/2005 | Dry | |
| 2013/0114827 | A1* | 5/2013 | Lee | ........................ B60Q 5/008 381/86 |
| 2015/0117670 | A1* | 4/2015 | Lee | ........................ B60Q 5/008 381/86 |
| 2016/0152183 | A1* | 6/2016 | Kim | ........................ B60Q 11/00 381/58 |
| 2016/0311368 | A1* | 10/2016 | Lee | ........................ B60Q 5/008 |

FOREIGN PATENT DOCUMENTS

| JP | H 07-177593 A | 7/1995 |
| JP | 2011-235774 A | 11/2011 |
| JP | 2012-148639 A | 8/2012 |
| JP | 2013-229730 A | 11/2013 |
| WO | 2011/141982 A1 | 11/2011 |

* cited by examiner

*Primary Examiner* — Mohammad Islam
(74) *Attorney, Agent, or Firm* — Mintz Levin Cohn Ferris Glovsky and Popeo, P.C.; Peter F. Corless

(57) ABSTRACT

An enclosure expansion type virtual engine sound system is provided. The system includes an enclosure case having a case enclosure accommodating a speaker to which a virtual engine sound is output and an enclosure back beam with an internal space divided into a speaker enclosure and a expanded enclosure as an extended space of the case enclosure for low band amplification of the engine sound and a space in which the engine sound is output in three directions. Accordingly, the enclosure back beam implements a low band amplification function in addition to a crash absorbing function. The engine sound is output in three directions through an internal space of the enclosure back beam, thereby solving a space restriction of a narrow engine room while satisfying regulations of the speaker.

17 Claims, 13 Drawing Sheets

SECTION A-A

SECTION B-B

SECTION C-C

SECTION D-D

SECTION E-E

ENCLOSURE EXPANSION TYPE VIRTUAL ENGINE SOUND SYSTEM AND VEHICLE USING THE SAME

CROSS-REFERENCE TO RELATED APPLICATIONS

This application claims priority to Korean Patent Application No. 10-2015-0145324, filed on Oct. 19, 2015, which is incorporated herein by reference in its entirety.

BACKGROUND

Field of the Invention

The present invention relates to a virtual engine sound system (hereinafter, VESS), and more particularly, to an enclosure expansion type virtual engine sound system in which a back beam, which is a component for strengthening crash performance of a bumper, is linked with an increased space of a low band sound range of a speaker and a vehicle using the same.

Description of Related Art

Generally, a VESS of a vehicle is a system in which a speaker is mounted in an engine room to output an artificial engine sound to an external sound. Therefore, the VESS is applied to environmentally friendly vehicles such as a hybrid electric vehicle (HEV) and an electric vehicle (EV) to prevent accident probability which may occur when pedestrians do not recognize the vehicles since minimal noise is generated when a motor is driven at a low speed.

Recently, the VESS is required to output a low band sound based on regulations of the speaker. For this purpose, the VESS includes an enclosure to output the low band sound. For example, the VESS includes the enclosure separately installed on a rear surface of the speaker along with the speaker to increase the low band sound output performance. However, the VESS including the separate enclosure along with the speaker may not avoid increasing material costs and a weight due to the enclosure.

In particular, since the VESS includes the separate enclosure installed on the rear surface of the speaker, a package space decreases substantially due to a cooler disposed at the rear surface of the speaker. Therefore, the engine room with the decrease of the package space due to the cooler has a limited layout (e.g., limited design freedom) and therefore may not be applied to the VESS including the separate enclosure along with the speaker.

SUMMARY

The present invention provides an enclosure expansion type virtual engine sound system in which an internal space of a back beam, which is a component for strengthening crash performance of a bumper, is used as an enclosure for the virtual engine sound, to allow the internal space of the back beam to implement a low band amplification function of an engine sound output from a speaker in addition to a shock absorbing function. Additionally, the internal space of the back beam may be used as an output path for the engine sound to output the engine sound in three directions of a front side and left and right sides, thereby solving a space restriction of a narrow engine room while satisfying regulations of the speaker, and a vehicle using the same.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, an enclosure expansion type virtual engine sound system may include: an enclosure speaker configured to output the virtual engine sound as an engine sound output signal and may include a case enclosure for low band amplification of the engine sound; and an enclosure back beam operating as an internal space to absorb an external shock as a back beam enclosure for the low band amplification of the engine sound and an engine sound output port through which the engine sounds may each be diffused in three directions.

In accordance with another exemplary embodiment of the present invention, an enclosure expansion type virtual engine sound system may include: a speaker configured to output the virtual engine sound; an enclosure case configured to form a case enclosure in which the speaker may be accommodated and configured to perform low band amplification of the engine sound using the case enclosure; and an enclosure back beam configured to be divided into a speaker enclosure which has an internal space deformed by an external shock and a speaker protruding surface of the enclosure case inserted into the internal space to amplify a low band and then transfer the amplified low band as an external output and an expanded enclosure inserted with an enclosure connection part of the enclosure case to perform the low band amplification.

The enclosure case may be coupled with the enclosure back beam to cause a portion of the speaker to form an exposed portion at a lower portion of the enclosure back beam. The exposed portion of the speaker may have a diameter of about half of the speaker. The speaker protruding surface may be configured to transmit the engine sound to be propagated to the speaker enclosure and the enclosure connection part may have the expanded enclosure communicate with the case enclosure through an air aperture formed on the enclosure connection part. The enclosure connection part may protrude higher than the speaker protruding surface in the enclosure case. The speaker protruding surface may be formed on a speaker cover to cover a speaker position aperture formed on the enclosure case. The speaker protruding surface may be coupled with a lower back beam pad to be inserted into the speaker enclosure and the enclosure connection part may be coupled with an upper back beam pad to be inserted into the expanded enclosure.

Further, the enclosure back beam may be configured to include a lower back beam forming the speaker enclosure, an upper back beam forming the expanded enclosure, and a back beam connection part separating the speaker enclosure and the expanded enclosure from each other while integrally connecting between the lower back beam and the upper back beam. A speaker output inlet aperture may be formed on the lower back beam to insert the speaker protruding surface and an enclosure insertion aperture may be formed on the upper back beam to insert the enclosure connection part. The speaker enclosure may include with left and right engine sound ports through which the engine sound may be output and the left and right engine sound ports may be formed at left and right opened end portions of the speaker enclosure.

The lower back beam may further include an auxiliary engine sound port configured to communicate with the speaker enclosure and the auxiliary engine sound port may be formed at any one of left and right end portions of the speaker enclosure. The lower back beam may include a reflecting plate as the speaker enclosure and the reflecting plate may be configured to output the engine sound to left and right end portions of the speaker enclosure. The reflecting plate may have a section structure of an inverted triangle of which the vertex is disposed toward the speaker protruding surface. Left and right spaces of a lower portion of the enclosure case not covered with the enclosure back beam may be each applied as part mounting spaces Sa and Sb in which horns may be mounted.

In accordance with a still another exemplary embodiment of the present invention, a vehicle may include: a virtual engine sound system configured to operate as an internal space divided into an enclosure case formed with a case enclosure accommodating a speaker through which a virtual engine sound may be output, a speaker enclosure, and an expanded enclosure as an expanded space of the case enclosure for low band amplification of the engine sound and a space in which the engine sound may be output in three directions; and a front bumper configured to have the enclosure back beam positioned therein to be blocked from the exterior and diffuse the engine sound output from the virtual engine sound system in three directions of a front side and left and right sides. The engine sound output system may be connected to a vehicle body of an engine room by left and right crash boxes and may be connected to the front bumper by left and right supports and may be applied to an environmentally friendly vehicle and the vehicle may be a hybrid electric vehicle (HEV) or an electric vehicle (EV).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings and these exemplary embodiments may be implemented in various forms by a person having ordinary skill in the art to which the present invention pertains and therefore the present invention is not limited to the embodiments described herein.

Figure 1:
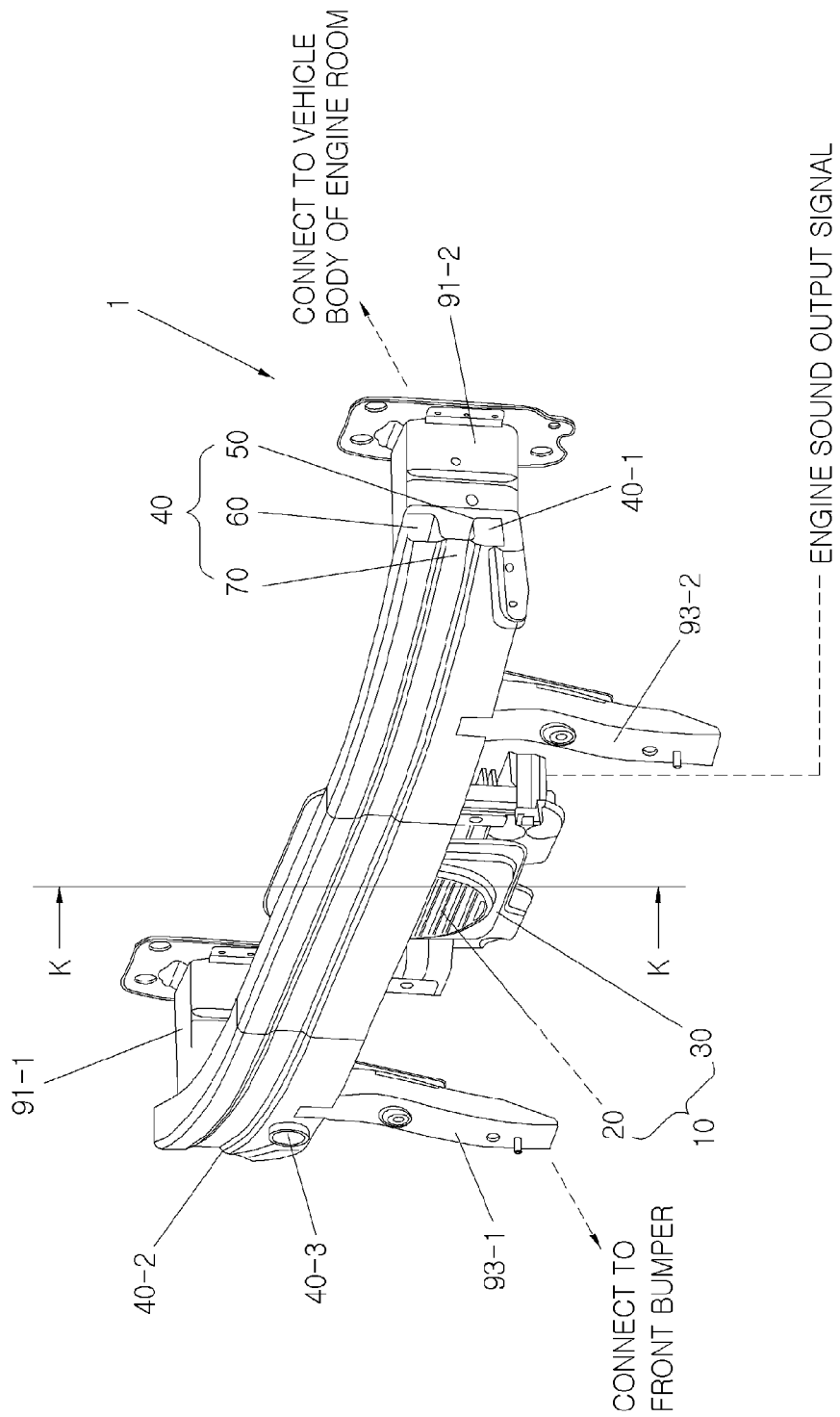
FIG. 1 is a view of an enclosure extension type virtual engine sound system in which an enclosure back beam according to an exemplary embodiment of the present invention is linked with an enclosure speaker.
Figure 2:
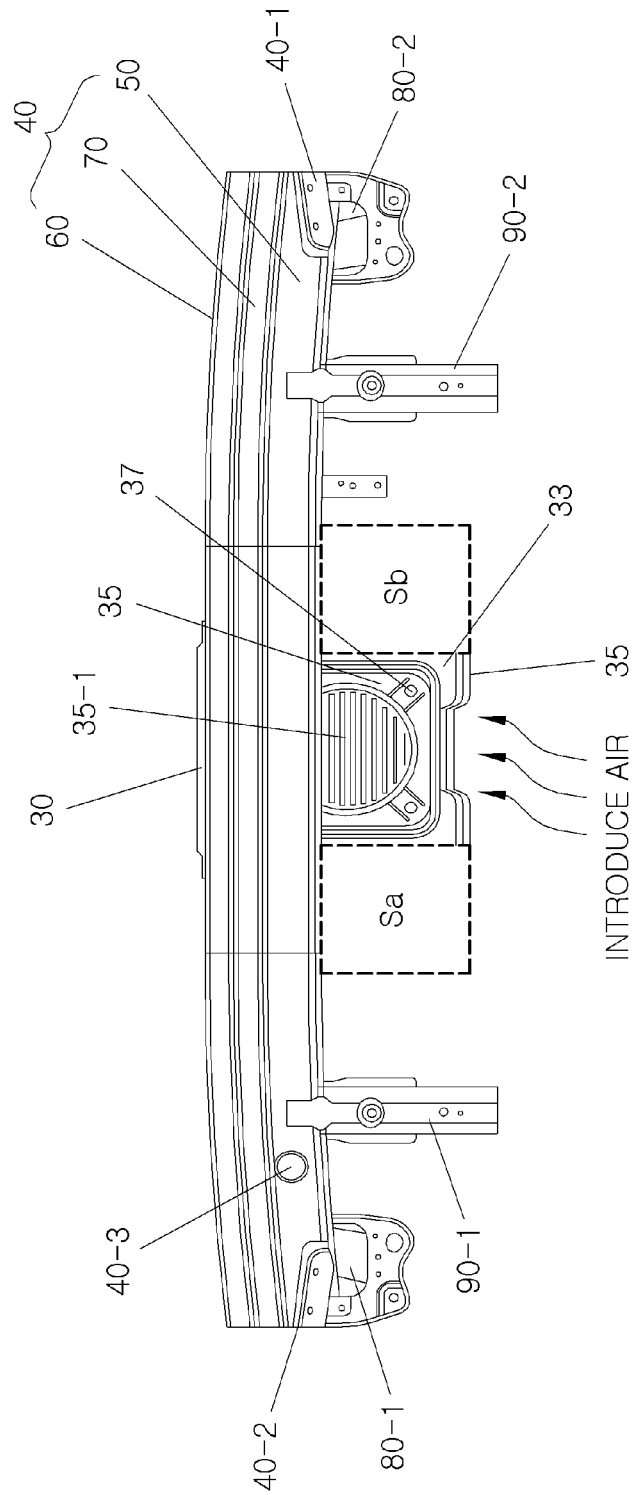
FIG. 2 is a front view of the enclosure extension type virtual engine sound system according to the exemplary embodiment of the present invention.

FIGS. 1 and 2 illustrate a configuration of a virtual engine sound system 1 (hereinafter, VESS) according to an exemplary embodiment of the present invention. Referring to FIG. 1, the VESS 1 may include an enclosure speaker 10 through which a virtual engine sound may be output as an engine sound output signal and an enclosure back beam 40 may operate as an extension type external enclosure linked with the enclosure speaker 10 to increase a low band sound among engine sounds of the enclosure speaker 10.

For example, the enclosure speaker 10 may include a speaker 20 forming a controller (not illustrated) and an electric circuit configured to output the engine sound as the engine sound output signal and an enclosure case 30 having the speaker 20 mounted therein to block the speaker 20 from the exterior. In particular, the enclosure case 30 may be fixed using a back surface of the enclosure back beam 40 to dispose the speaker 20 toward a front surface of the enclosure back beam 40. In particular, the front surface of the enclosure back beam 40 indicates a surface toward a front bumper of the vehicle, while the back surface thereof indicates a surface toward an engine of the engine room.

For example, the enclosure back beam 40 may include a lower back beam 50 that forms a hollow internal space, an upper back beam 60 that forms a hollow internal space, and a back beam connection part 70 integrally connecting between the lower back beam 50 and the upper back beam 60, in which the lower back beam 50 may be configured to output the engine sound of the enclosure speaker 10 to the exterior through two left and right engine sound ports 40-1 and 40-2 and one auxiliary engine sound port 40-3. In particular, the left and right engine sound ports 40-1 and 402- may be formed at left and right opened end portions of the lower back beam 50. The auxiliary engine sound port 40-3 may be formed at any one of the left and right end portions of a lower back beam enclosure space 50-1 and may protrude from the lower back beam 50 in a hollow pipe shape. Therefore, the auxiliary engine sound port 40-3 may be shown as being proximate to the left engine sound port 40-1 but if necessary, may be provided at a position proximate to the right engine sound port 40-2.

According to the present exemplary embodiment, the enclosure back beam 40 may form the internal space to be positioned inside the bumper and thus is the same as the back beam absorbing external shocks applied to the bumper. Therefore, the enclosure back beam 40 may further be linked with left and right crash boxes 91-1 and 91-2 and left and right supports 93-1 and 93-2 which configure the bumper. The left and right crash boxes 91-1 and 91-2 may be positioned horizontally at left and right end portions of the enclosure back beam 40 using the back surface of the enclosure back beam 40 and the left and right supports 93-1 and 93-2 may be positioned vertically toward the enclosure back beam 40 using a front surface of the enclosure back beam 40. Therefore, the left and right crash boxes 91-1 and 91-2 may connect the enclosure back beam 40 coupled with the VESS 1 to a vehicle body configuring the engine room and the left and right supports 93-1 and 93-2 may connect the enclosure back beam 40 coupled with the VESS 1 to front bumper (see FIG. 13) positioned in front of the engine room.

Referring to FIG. 2, the VESS 1 may increase cooling performance by an air cooling action (e.g., traveling wind, or wind caused by vehicle speed) introduced into the enclosure speaker 10. In particular, the VESS 1 may secure the left and right spaces of the enclosure back beam 40 occupied by the left and right portions of the enclosure case 30 as left and right part mounting spaces Sa and Sb by reducing the entire size of the case 30, to most effectively utilize the available package space. For example, the left and right part mounting spaces Sa and Sb may be used as a space in which a horn and various types of electrical equipments are mounted, and thus may be usefully applied for efficiency of a package space of a hybrid electric vehicle (HEV) in which the horn is mounted.

Figure 3:
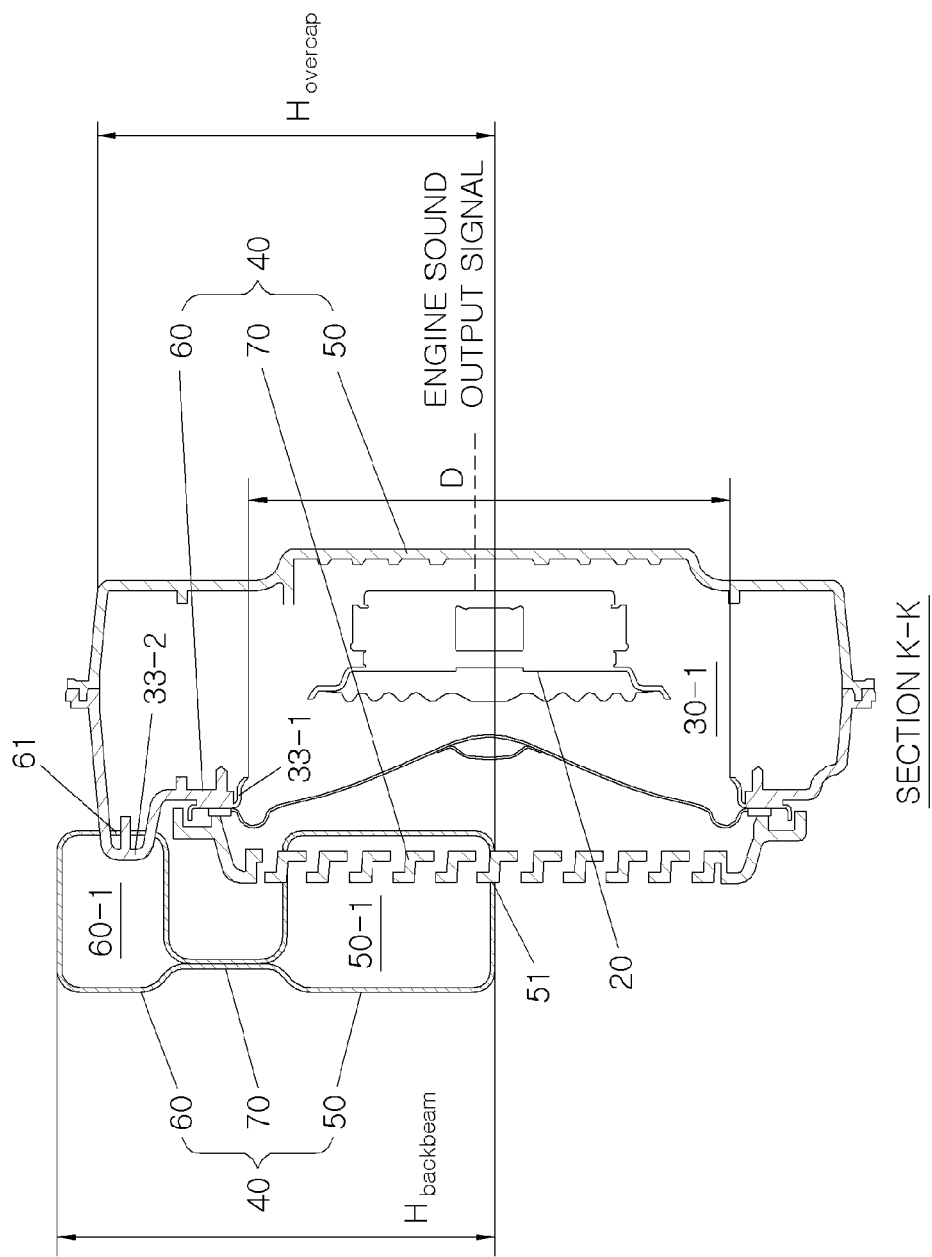
FIG. 3 is an assembled cross-sectional view of the enclosure speaker according to the exemplary embodiment of the present invention with the enclosure back beam.

Meanwhile, FIG. 3 is a section K-K of FIG. 1 and illustrates an internal structure of the enclosure speaker 10 and the enclosure back beam 40. As illustrated, the enclosure speaker 10 may include a case enclosure 30-1 of which the internal space for increasing the output of the speaker 20 may operate as the enclosure and may include the enclosure case 30 in which the speaker 20 is accommodated in the case enclosure 30-1. In particular, the enclosure case 30 may include a rear housing 31, a front housing 33, and a speaker cover 35.

The rear housing 31 may be coupled with the front housing 33 to form the case enclosure 30-1. Additionally, the rear housing 31 may be coupled with the front housing 33 by a screw or a bolt, but is not limited thereto, other fastening mechanisms may be used to connect the front housing and the rear housing. Therefore, the rear housing 31 may form a rear portion of the enclosure case 30 and the front housing 33 may form a front portion of the enclosure case 30. The front housing 30 may be coupled with the upper back beam 60 of the enclosure back beam 40, to position the enclosure case 30 on the back surface of the enclosure back beam 40.

Further, the front housing 33 may include a speaker position aperture 33-1 formed at a position facing the speaker 20 to transfer the output of the speaker 20 and the speaker position aperture 33-1 may be formed to have a diameter about equal to or slightly less than a diameter D of the speaker 20, but not larger than. Further, the front housing 33 may include an enclosure connection part 33-2 formed at a position coupled with the upper back beam 60 of the enclosure back beam 40 and the enclosure connection part 33-2 may be inserted into the upper back beam 60 of the enclosure back beam 40.

The speaker cover 35 may be coupled with a front portion of the front housing 33 to cover the speaker position aperture 33-1. The speaker cover 35 and the front housing 33 may be coupled with each other by a screw 37 (see FIG. 4) or a bolt, or any other fastening mechanism. In particular, the speaker cover 35 may include a speaker protruding surface 35-1 that extends toward a diameter coinciding with a diameter D of the speaker 20 and the speaker protruding surface 35-1 may approach the lower back beam 50 of the enclosure back beam 40. Therefore, the speaker protruding surface 35-1 may be formed to have a protruded height lower than the enclosure connection part 33-2.

As illustrated, the lower back beam 50 of the enclosure back beam 40 may include a hollow internal space formed in the speaker enclosure 50-1 and the speaker enclosure 50-1 may be inserted with a speaker protruding surface 35-1 of the speaker cover 35 through a speaker output inlet aperture 51 through which the speaker enclosure 50-1 may communicate with the exterior. The upper back beam 60 of the enclosure back beam 40 may include the hollow internal space formed in an expansion type enclosure 60-1 and the expansion type enclosure 60-1 may be inserted with the enclosure connection part 33-2 of the front housing 33 through the enclosure insertion aperture 61 through which the expansion type enclosure 60-1 may communicate with the exterior. Therefore, when considering a layout of the enclosure case 30 and the enclosure back beam 40, an overlap hoverlap of the enclosure case 30 may be an H back beam of the enclosure back beam 40 and may be formed to have a size where about half of the diameter D of the speaker 20 is covered.

Figure 4:
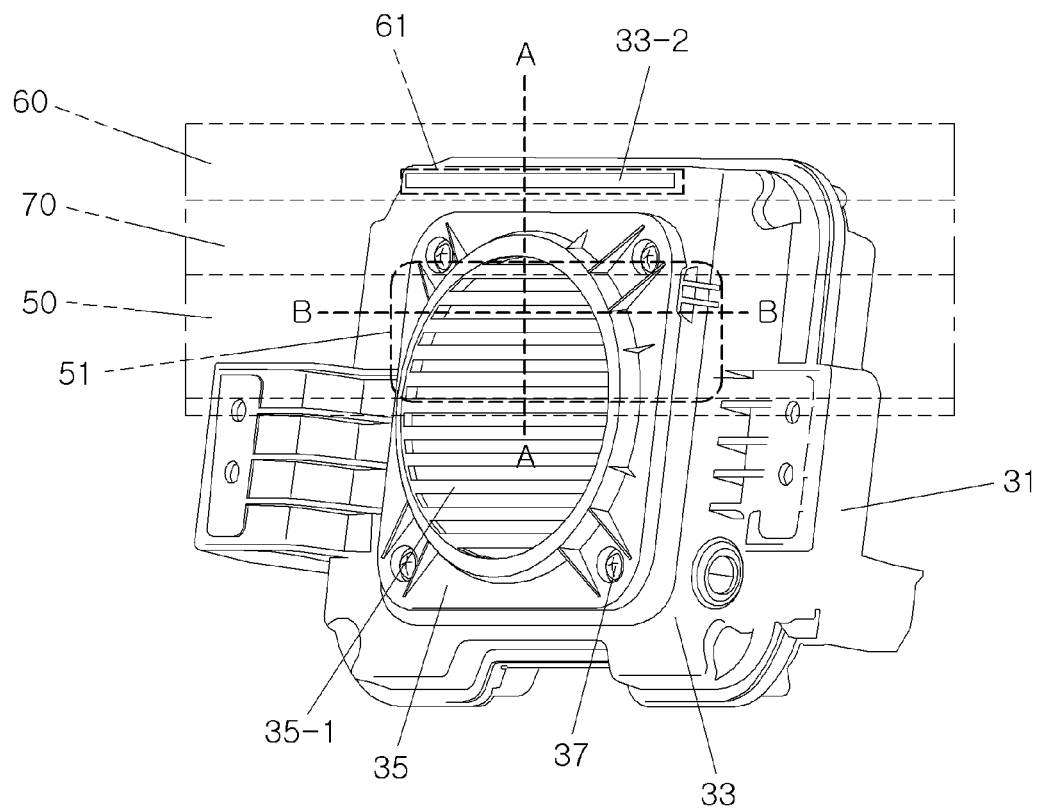
FIG. 4 is a view of the enclosure speaker according to the exemplary embodiment of the present invention.
Figure 5:
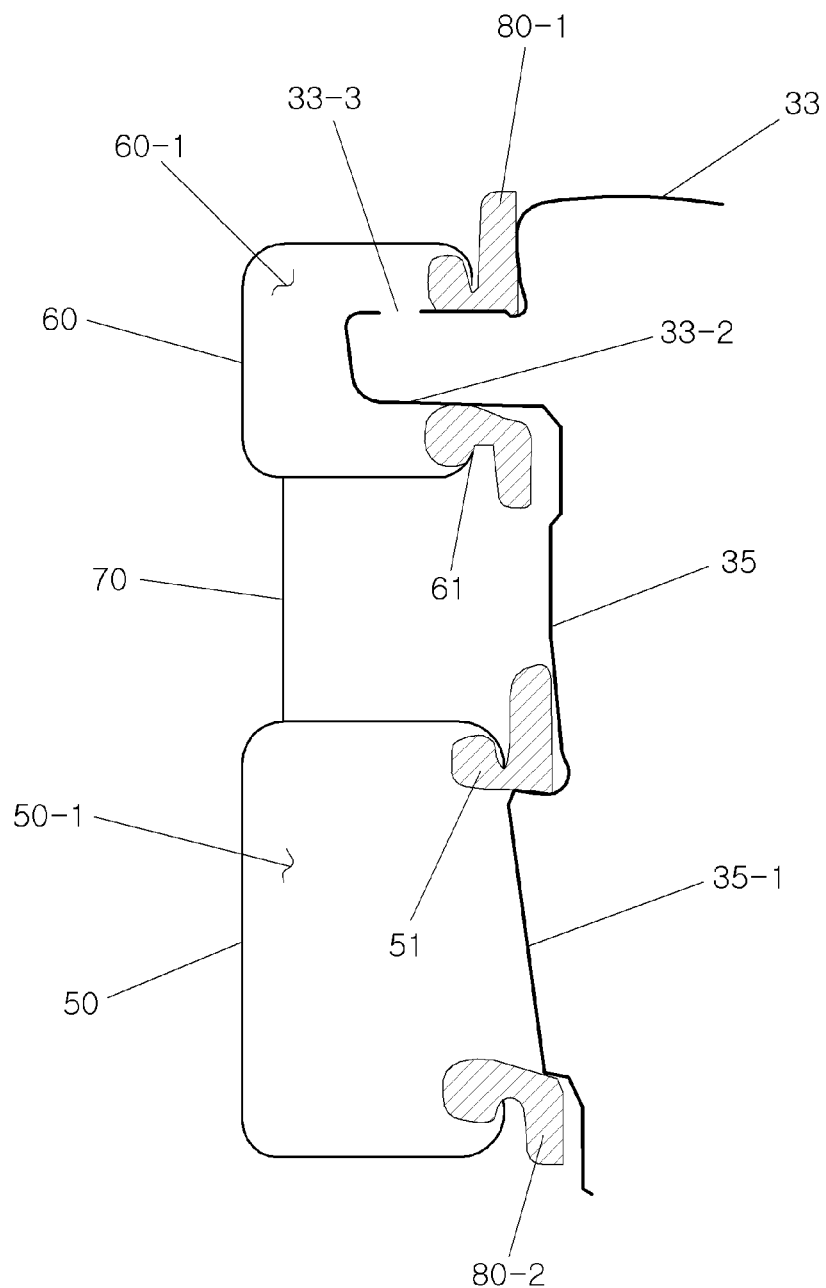
FIGS. 5 and 6 each are cross-sectional views of the enclosure speaker according to the exemplary embodiment of the present invention.

Meanwhile, FIG. 4 and FIG. 5 which is A-A section of FIG. 4 illustrate a detailed structure of a section of the enclosure connection part 33-2 for the enclosure back beam 40 and the speaker protruding surface 35-1. For example, referring to the sections of the upper back beam 60 and the enclosure connection part 33-2, the enclosure connection part 33-2 may be inserted into the enclosure insertion aperture 61 (see a small rectangle represented by a virtual line of FIG. 3) to be positioned in an inside space of the expansion type enclosure 60-1, to connect the enclosure case 30 to the upper back beam 60 of the enclosure back beam 40. In particular, the enclosure connection part 33-2 may be divided into upper and lower portions to form a space that communicates with the case enclosure 30-1. As a result, the case enclosure 30-1 has the space expanded toward the expansion type enclosure 60-1 through an air aperture 33-3.

Figure 6:
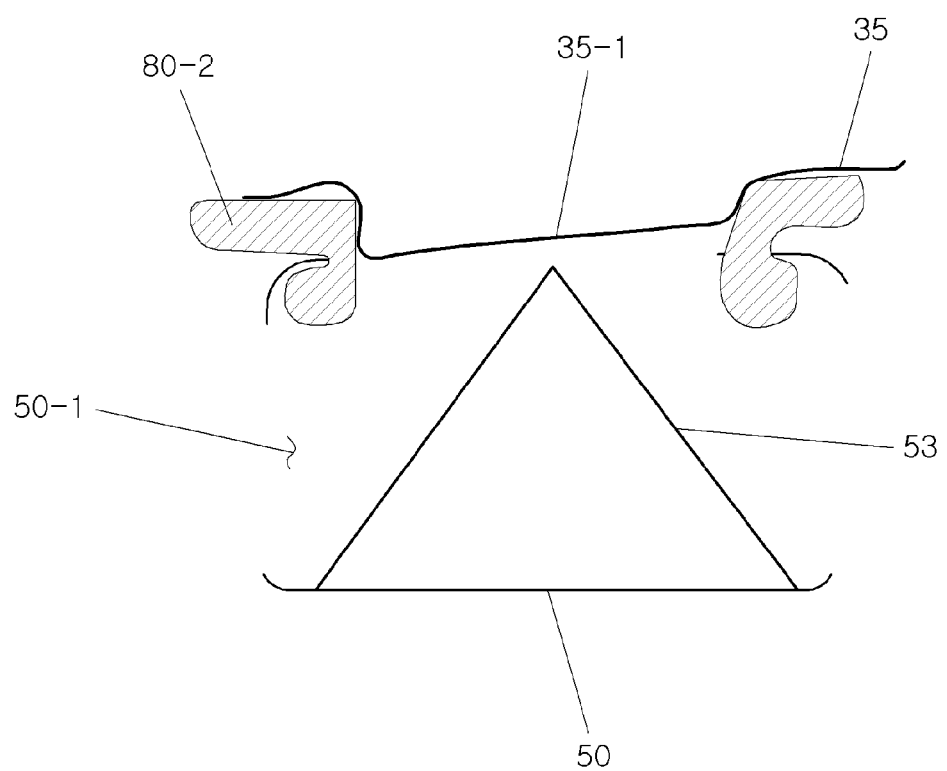
Figure 7:
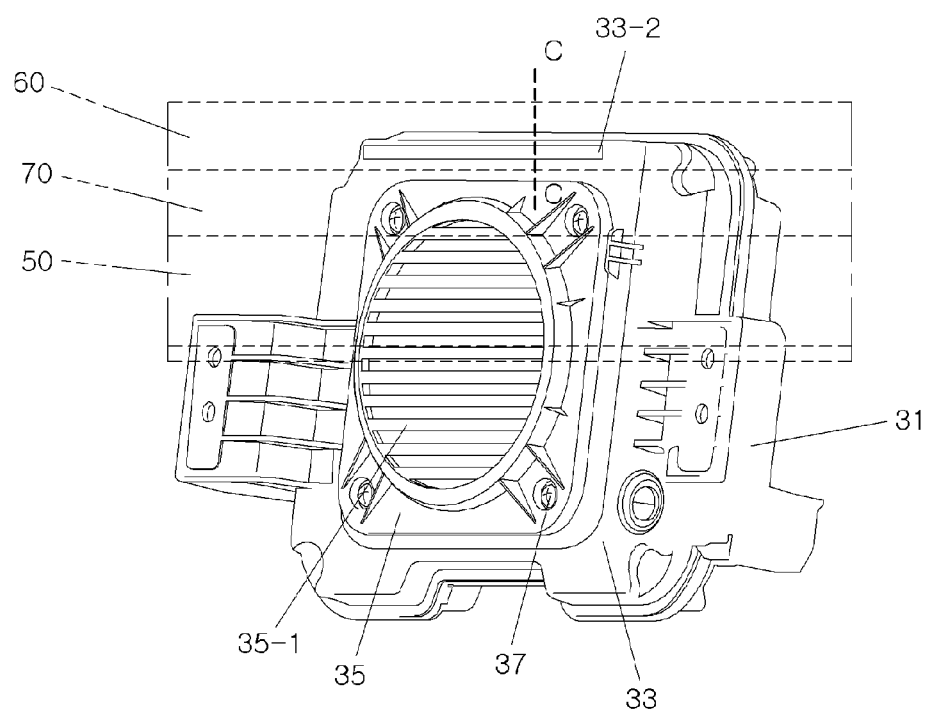
FIGS. 7 and 8 each are diagrams of an air flow state of the enclosure speaker according to the exemplary embodiment of the present invention and an upper back beam.
Figure 8:
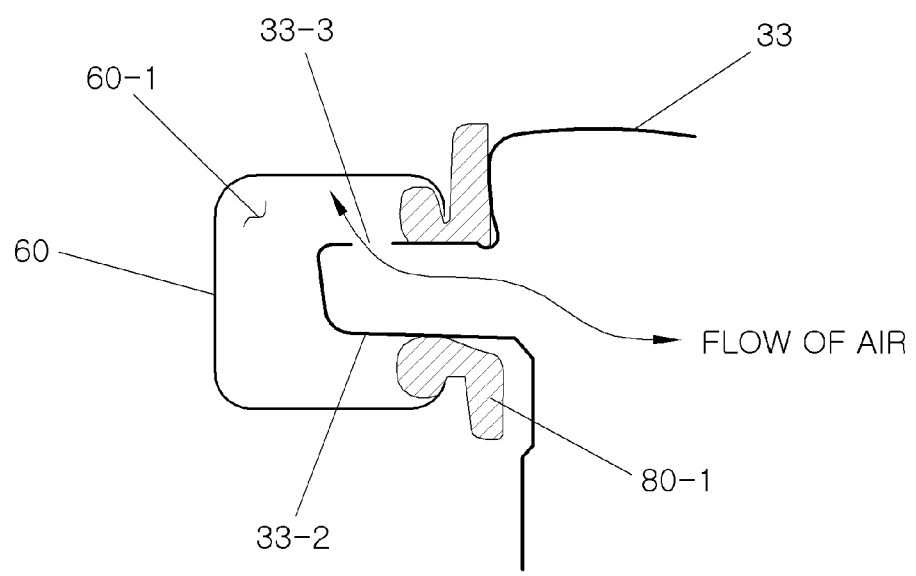

For example, referring to the sections of the lower back beam 50 and the speaker protruding surface 35-1, the speaker protruding surface 35-1 may approach the speaker output inlet aperture 51 (see a large rectangle represented by a virtual line of FIG. 3). As a result, the speaker enclosure 50-1 may be expanded into the space of the case enclosure 30-1 through the speaker output inlet aperture 51. In particular, like FIG. 4 and FIG. 6 which is section B-B of FIG. 4, the lower back beam 50 may include a reflecting plate 53 as the speaker enclosure 50-1 and the reflecting plate 53 may have a sectional structure of an inverted triangle and may be positioned to approach the speaker protruding surface 35-1.

Therefore, the VESS 1 may use all of the case enclosure 30-1 of the enclosure case 30, the expanded enclosure 60-1 of the upper back beam 60, and the speaker enclosure 50-1 of the lower back beam 50 as the enclosure space of the engine sound from the speaker 20, thereby more easily satisfying the regulations of the speaker requiring the low band sound output.

Further, the enclosure connection part 33-2 and the enclosure insertion aperture 61 may be sealed with an upper back beam pad 80-1 and the speaker protruding surface 35-1 and the speaker output inlet aperture 51 may be sealed with a lower back beam pad 80-2, thereby preventing foreign objects from penetrating from the exterior. In particular, the upper back beam pad 80-1 may be inserted into the enclosure insertion aperture 61 and the lower back beam pad 80-2 may be inserted into the speaker output inlet aperture 51.

Meanwhile, FIGS. 7 to 11 illustrate that the case enclosure 30-1, the expanded enclosure 60-1, and the speaker enclosure 50-1 operate as the expansion type enclosure space of the VESS 1 and may be configured to output the engine sound in three directions. For example, referring to FIG. 7 and FIG. 8 which is section C-C of FIG. 7, air of the upper back beam 60 may be circulated from the expanded enclosure 60-1 toward the case enclosure 30-1 through the air aperture 33-3 of the enclosure connection part 33-2, or vice versa. In other words, the air flowing through the air aperture 33-3 may be circulated toward the expanded enclosure 60-1 and the case enclosure 30-1, and thus, the expanded enclosure 60-1 may operate as the expansion space of the case enclosure 30-1. In particular, the air aperture 33-3 may prevent moisture, which may be collected in the expanded enclosure 60-1, from being discharged to the case enclosure 30-1, to prevent an electrical short of the stability of the speaker 20 accommodated in the case enclosure 30-1 due to the moisture.

Figure 9:
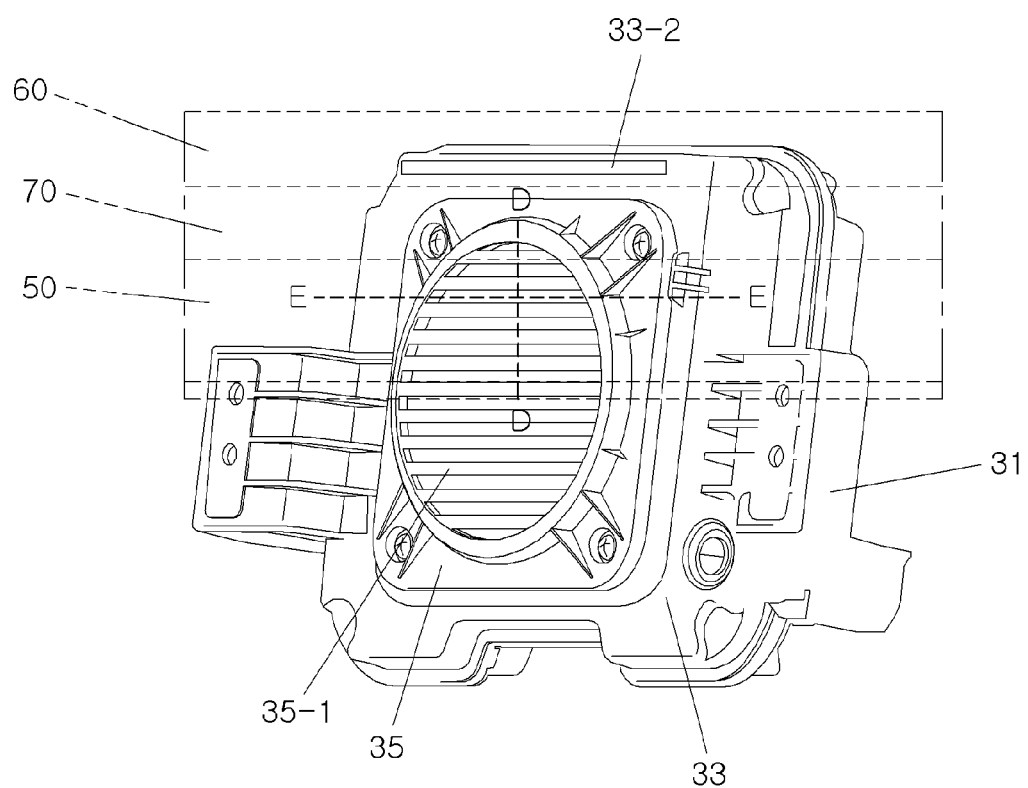
FIGS. 9 to 11 each are diagrams of an engine sound transfer state of the enclosure speaker according to the exemplary embodiment of the present invention and a lower back beam.
Figure 10:
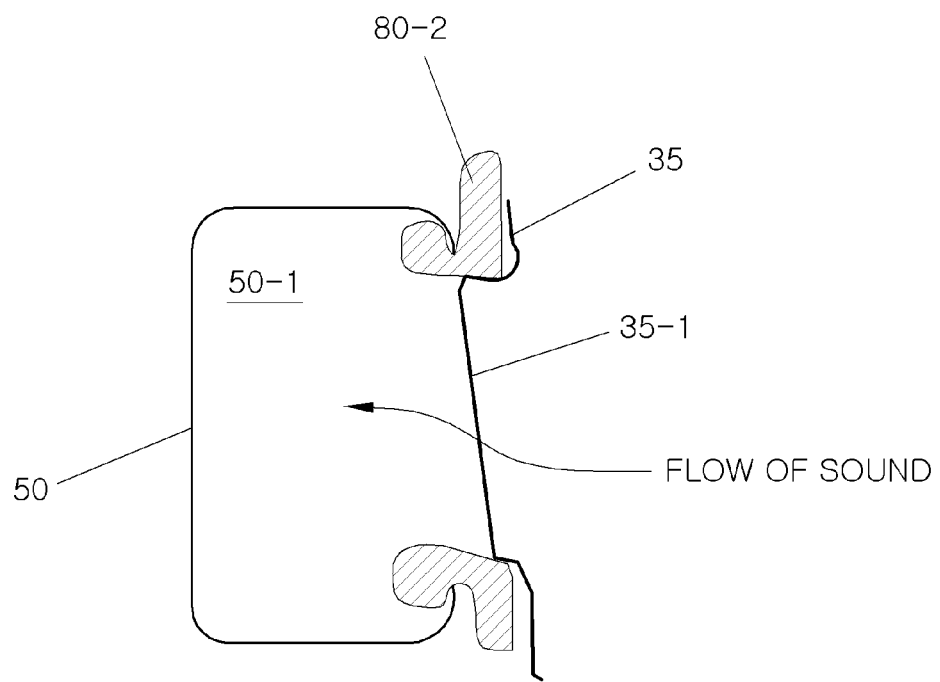
Figure 11:
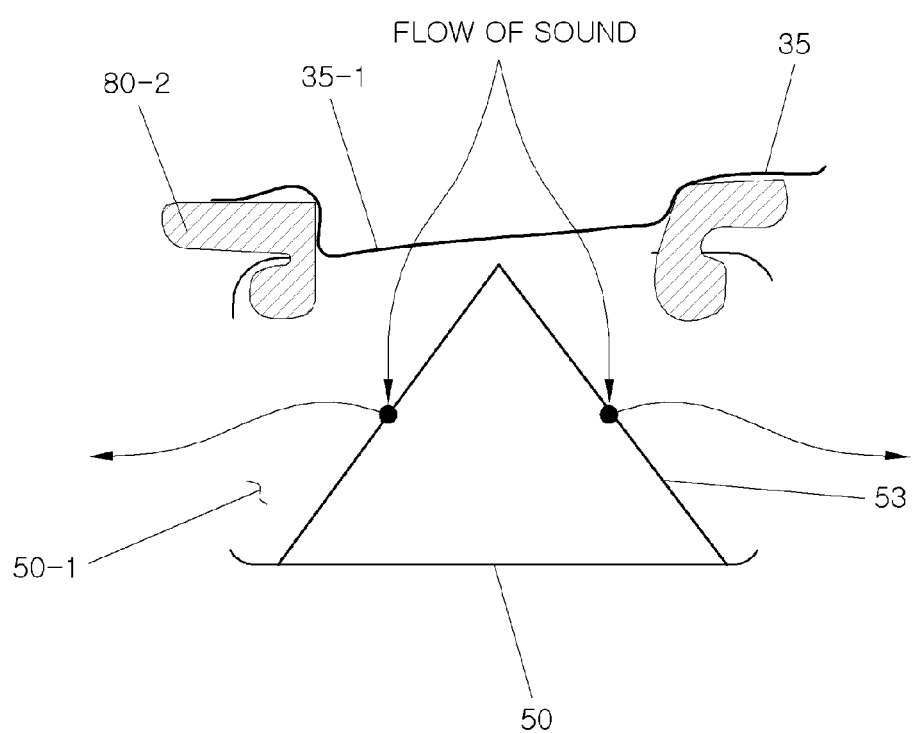

For example, referring to FIG. 9 and FIG. 10 which is section D-D of FIG. 9, the speaker protruding surface 35-1 may be configured to directly transfer the engine sound output of the speaker 20 to the speaker enclosure 50-1 of the lower back beam 50, and thus, the speaker enclosure 50-1 may operate as the expansion space of the case enclosure 30-1 and as a place where the engine sound may be output in three directions. In particular, referring to FIG. 11 which is section E-E of FIG. 9, the reflecting plate 53 having the inverted triangle which is provided in the speaker enclosure 50-1 may divide the engine sound output of the speaker 20 into left and right sides, to more effectively diffuse the engine sound up to the left and right end portions of the speaker enclosure 50-1.

Figure 12:
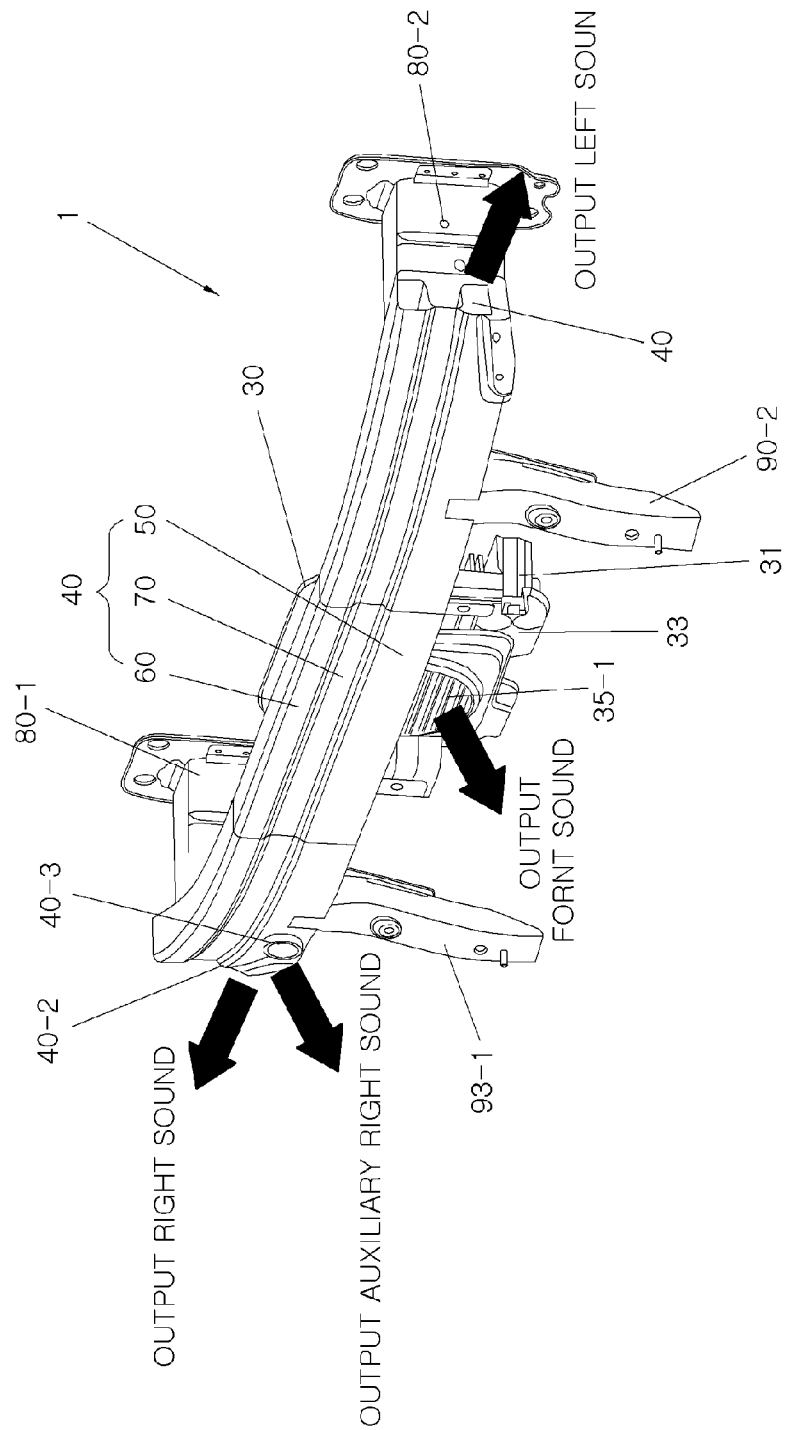
FIG. 12 is a diagram illustrating a state in which an engine sound is propagated to the exterior, in the enclosure extension type virtual engine sound system according to the exemplary embodiment of the present invention.

Meanwhile, FIG. 12 illustrates the engine sound output state of the VESS 1. As illustrated, the engine sound output from the speaker 20 of the enclosure speaker 10 may be divided into a front sound output transferred to the front portion of the enclosure back beam 40 and a lateral sound output transferred to left and right side portions of the lower back beam 50 of the enclosure back beam 40. Therefore, the engine sound may be simultaneously generated in at least three directions through the front sound output and the lateral sound output.

In particular, the front sound output may be output directly from the speaker 20 accommodated in the enclosure case 30, and may be output as the engine sound of which the low band is sufficiently amplified since the enclosure case 30 may be linked with the expanded enclosure 60-1 to expand the space of the case enclosure 30-1. Further, the speaker enclosure 50-1 may be used as the enclosure space that amplifies the low band sound among the engine sound transferred from the speaker 20, to output the lateral sound as the engine sound of which the low band is amplified. Additionally, since the left and right engine sound ports 40-1 and 40-2 transferring the lateral sound output as the engine sound may be formed at the opened left and right end portions of the speaker enclosure 50-1, the engine sound may be output from the left and right sides of the lower back beam 50, respectively, and simultaneously, the engine sound output using the auxiliary engine sound port 40-3 that communicates with the speaker enclosure 50-1 may be added to improve the efficiency of the low band output of the engine sound. Therefore, when the VESS 1 is applied to the vehicle, the engine sound of the speaker 20 may be diffused in at least three directions from the engine room of the vehicle.

Figure 13:
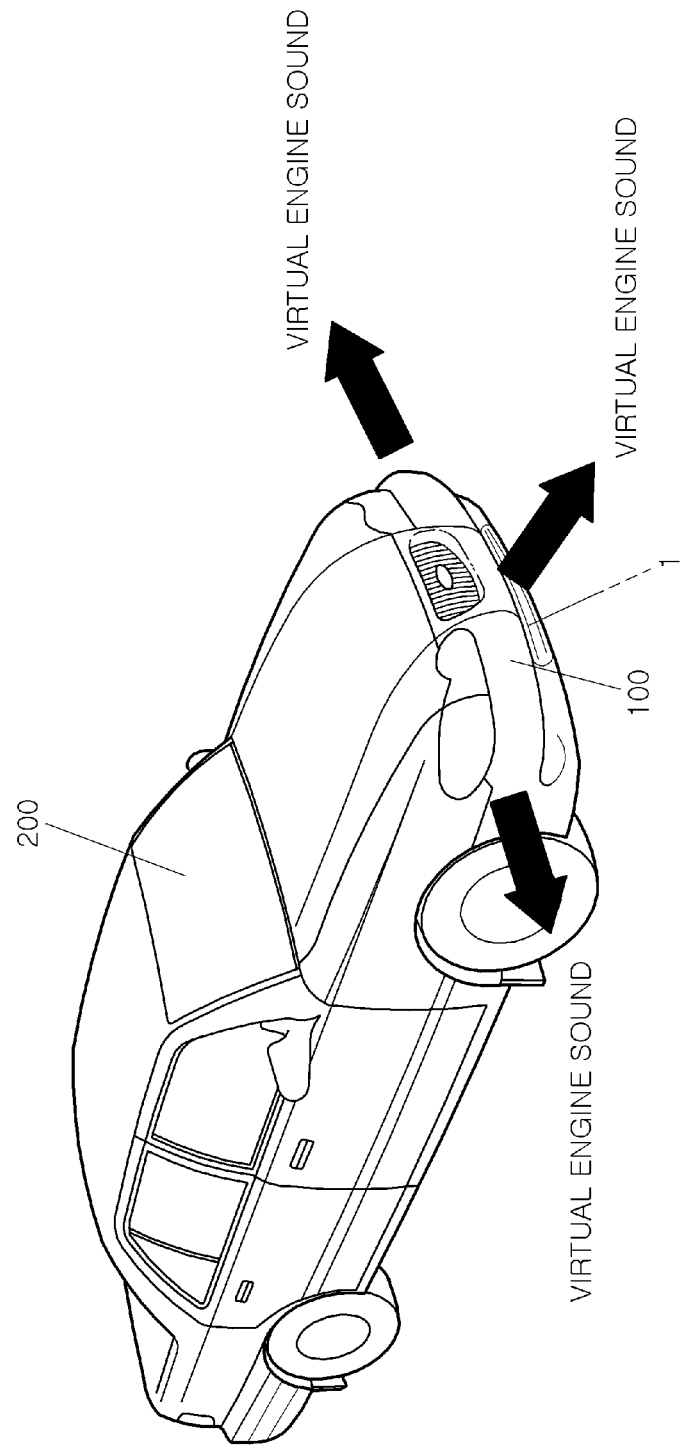
FIG. 13 is a diagram illustrating an example of a vehicle in which the enclosure extension type virtual engine sound system according to the exemplary embodiment of the present invention is applied.

Meanwhile, FIG. 13 illustrates an example of a vehicle 200 to which the VESS 1 is applied. As illustrated, the vehicle 200 may an environmentally friendly vehicle such as a hybrid electric vehicle (HEV) and an electrical vehicle (EV) and the VESS 1 may be disposed inside the front bumper 100. Therefore, the engine sound output from the VESS 1 may be simultaneously diffused to the outside as the front sound output transferred forward and the lateral sound output transferred in the left and right directions. As a result, even though the motor of the vehicle 200 is driven at a low speed where minimal noise is generated causing difficult in vehicle detection, the engine sound diffused in three directions using the front bumper 100 may be transferred to pedestrians at the front side and the left and right sides of the vehicle 200.

As described above, the virtual engine sound system according to the exemplary embodiment of the present invention may include the enclosure case 30 provided with the case enclosure 30-1 accommodating the speaker 20 to which the virtual engine sound output and the enclosure back beam 40 acting as the internal space divided into the speaker enclosure 50-1 and the expanded enclosure 60-1 as the extended space of the case enclosure 30-1 for the low band amplification of the engine sound and the space in which the engine sound may be output in three directions, and thus the enclosure back beam 40 which is the component for strengthening the crash performance of the bumper may implement the low band amplification function in addition to the crash absorbing function, in particular, the engine sound may be output in three directions through the internal space of the enclosure back beam 40, thereby solving the space restriction of the narrow engine room while satisfying the regulations of the speaker.

According to the exemplary embodiments of the present invention, the VESS may use the back beam of the bumper as the enclosure to achieve the following advantages and effects.

First, the back beam which is the component of the bumper may be used as the enclosure to save the costs and reduce weight occurring upon the application of the enclosure.

Second, the separate enclosure may not be applied to efficiently use the package space even in the narrow engine room space.

Third, the wide internal space of the back beam may be used as the enclosure to reproduce the sound source close to the engine sound by abundantly producing the low band sound.

Fourth, the back beam may transfer the sound to the left and right sides through one speaker to satisfy the protection regulations of the pedestrian.

Fifth, the traveling wind introduced through the bumper may pass through the back beam to increase the cooling performance of the speaker due to the introduction of air.

Sixth, the speaker size may be reduced by extending the enclosure linked with the wide internal space of the back beam to secure the space in which the horns installed at the left and right of the engine room and various types of electrical equipment are mounted.

The foregoing exemplary embodiments are merely examples to allow a person having ordinary skill in the art to which the present invention pertains (hereinafter, referred to as "those skilled in the art") to more easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. An enclosure expansion type virtual engine sound system, comprising:
   an enclosure case that includes an internal space in which a speaker configured to output a virtual engine sound is accommodated and the internal space operates as a case enclosure in which a low band amplification of the engine sound is performed; and
   an enclosure back beam divided into a speaker enclosure having an internal space deformed by an external shock and having a speaker protruding surface of the enclosure case inserted into the internal space to amplify a low band and then transfer the amplified low band as an external output and an expanded enclosure inserted with an enclosure connection part of the enclosure case to perform the low band amplification.

2. The enclosure expansion type virtual engine sound system of claim 1, wherein the enclosure case is coupled with the enclosure back beam and a portion of the speaker forms an exposed portion at a lower portion of the enclosure back beam.

3. The enclosure expansion type virtual engine sound system of claim 2, wherein the exposed portion of the speaker has a diameter of about half of the speaker.

4. The enclosure expansion type virtual engine sound system of claim 1, wherein the speaker protruding surface is configured to transmit the engine sound to be propagated to the speaker enclosure and the enclosure connection part has the expanded enclosure communicate with the case enclosure through an air aperture formed on the enclosure connection part.

5. The enclosure expansion type virtual engine sound system of claim 4, wherein the enclosure connection part protrudes higher than the speaker protruding surface in the enclosure case.

6. The enclosure expansion type virtual engine sound system of claim 5, wherein the speaker protruding surface is formed on a speaker cover that covers a speaker position aperture formed on the enclosure case.

7. The enclosure expansion type virtual engine sound system of claim 4, wherein the speaker protruding surface is coupled with a lower back beam pad to be inserted into the speaker enclosure and the enclosure connection part is coupled with an upper back beam pad to be inserted into the expanded enclosure.

8. The enclosure expansion type virtual engine sound system of claim 1, wherein the enclosure back beam is configured to include a lower back beam forming the speaker enclosure, an upper back beam forming the expanded enclosure, and a back beam connection part that separates the speaker enclosure and the expanded enclosure while integrally connecting between the lower back beam and the upper back beam.

9. The enclosure expansion type virtual engine sound system of claim 8, wherein the lower back beam includes a speaker output inlet aperture into which inserting the speaker protruding surface is inserted and the upper back beam includes an insertion aperture into which the enclosure connection part is inserted.

10. The enclosure expansion type virtual engine sound system of claim 8, wherein the speaker enclosure includes left and right engine sound ports through which the engine sound is output and the left and right engine sound ports are formed at left and right opened end portions of the speaker enclosure.

11. The enclosure expansion type virtual engine sound system of claim 8, wherein the speaker enclosure communicates with an auxiliary engine sound port and the auxiliary engine sound port is positioned at any one of left and right end portions of the speaker enclosure.

12. The enclosure expansion type virtual engine sound system of claim 8, wherein the speaker enclosure includes a reflecting plate and the reflecting plate is configured to output the engine sound to left and right end portions of the speaker enclosure.

13. The enclosure expansion type virtual engine sound system of claim 12, wherein the reflecting plate includes a section structure of an inverted triangle of which the vertex is disposed toward the speaker protruding surface.

14. The enclosure expansion type virtual engine sound system of claim 1, wherein left and right spaces of a lower portion of the enclosure case not covered with the enclosure back beam are each applied as part mounting spaces in which horns are mounted.

15. A vehicle, comprising:
   a virtual engine sound system having an internal space divided into an enclosure case formed with a case enclosure that accommodates a speaker through which a virtual engine sound is output, a speaker enclosure, and an expanded enclosure as an expanded space of the case enclosure for low band amplification of the engine sound and a space in which the engine sound is output in three directions; and
   a front bumper configured to have the virtual engine sound system positioned therein to be blocked from the outside and diffuse the engine sound output from the virtual engine sound system in three directions of a front side and left and right sides.

16. The vehicle of claim 15, wherein the engine sound output system is connected to a vehicle body of an engine room by left and right crash boxes and is connected to the front bumper by left and right supports.

17. The vehicle of claim 15, wherein the virtual engine sound system is applied to an environmentally friendly vehicle and the environmentally friendly vehicle is a hybrid electric vehicle (HEV) or an electric vehicle (EV).

* * * * *